(12) United States Patent
Buckmeier et al.

(10) Patent No.: US 8,077,004 B2
(45) Date of Patent: Dec. 13, 2011

(54) ELECTRICAL ISOLATION DEVICE CAPABLE OF LIMITING MAGNETIC SATURATION EVEN UPON RECEIPT OF HIGH POWER D.C. BIAS AND, METHOD FOR MAKING THE SAME AND CONNECTOR INCORPORATING THE SAME

(75) Inventors: Brian J. Buckmeier, San Diego, CA (US); John Hess, Timonium, MD (US); Edwin Edralin, San Diego, CA (US); Joseph Berry, San Diego, CA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 0 days.

(21) Appl. No.: 12/849,941

(22) Filed: Aug. 4, 2010

(65) Prior Publication Data

US 2011/0001596 A1 Jan. 6, 2011

Related U.S. Application Data

(63) Continuation of application No. 11/675,792, filed on Feb. 16, 2007, now abandoned.

(51) Int. Cl.
*H01F 27/30* (2006.01)
(52) U.S. Cl. .......................... 336/182; 336/188; 336/229
(58) Field of Classification Search .................. 336/229, 336/180, 184, 188, 182
See application file for complete search history.

(56) References Cited

U.S. PATENT DOCUMENTS

| | | | | |
|---|---|---|---|---|
| 4,119,914 A * | 10/1978 | Duncan | ........................ | 455/331 |
| 5,956,244 A * | 9/1999 | Rehm et al. | ...................... | 363/70 |
| 6,702,610 B2 | 3/2004 | Zheng et al. | | |
| 6,709,295 B2 | 3/2004 | Givens et al. | | |
| 6,739,915 B1 | 5/2004 | Hyland et al. | | |
| 6,872,098 B2 | 3/2005 | Wojtacki et al. | | |
| 7,033,210 B1 | 4/2006 | Laurer et al. | | |
| 7,140,923 B2 | 11/2006 | Karir et al. | | |
| 7,429,195 B2 | 9/2008 | Buckmeier et al. | | |
| 7,612,641 B2 * | 11/2009 | Jean et al. | ...................... | 336/192 |
| 7,724,118 B1 * | 5/2010 | Chen | ............................. | 336/229 |
| 2005/0136731 A1 * | 6/2005 | Brown et al. | ................. | 439/490 |

FOREIGN PATENT DOCUMENTS

JP 2009043753 A * 2/2009

* cited by examiner

*Primary Examiner* — Anh Mai
(74) *Attorney, Agent, or Firm* — Cozen O'Connor

(57) ABSTRACT

An electrical device is produced by winding wires around a core. The device may be used as a transformer. Wires are inserted into, through and around a first hole and a first side of a core a desired number of times. Thereafter, the wires are extended along either a top or a bottom of the core and then passed through and around a second hole of the core. After the wires are wound around the second hole of the core and a second side of the core, the production of the device is complete.

15 Claims, 8 Drawing Sheets

ELECTRICAL ISOLATION DEVICE CAPABLE OF LIMITING MAGNETIC SATURATION EVEN UPON RECEIPT OF HIGH POWER D.C. BIAS AND, METHOD FOR MAKING THE SAME AND CONNECTOR INCORPORATING THE SAME

BACKGROUND OF THE INVENTION

The connector industry is moving towards an environment where virtually any device may be powered over a network using an ethernet cable. Previously, such power requirements reached as high as 15 watts. Now standards are requiring that ethernet cables and corresponding connectors handle as much as 30 watts. In a typical RJ45 type connector assembly where a modular plug mates in a male-female relationship with a jack, an isolating magnetic device is used in the connector to handle direct current ("DC") offsets. Such offsets may be caused by various factors including imbalances in the wires of the plug.

For example, data is frequently transmitted over a pair of conductive wires. When transmitting data, the pair of wires may ideally have voltage potentials to ground such that a voltage in one wire of the pair is equal and opposite to the voltage in the other wire of the pair. For example, one wire may have a potential of −2.5 volts and the other wire may have a potential of +2.5 volts. If there are imbalances in the pair of wires or extraneous electro-magnetic interference, the two wires may not have exactly equal and opposite voltages. For example, one wire may have −2 volts and the other wire may have +3 volts. Although there is still a net difference across the pair of wires of +5 volts (which may, for example, correspond to a logic "1"), such a voltage imbalance will generate a current imbalance. Conventional technology uses isolating magnetic devices to deal with such imbalances. However, prior art magnetic devices cannot physically handle the magnetizing force which may be induced by imbalanced DC current having a power complying with the power requirements of new standards. If the transformer is not capable of handling such imbalances, the transformer may saturate and data may not transmit from one side of the transformer to the other. For example, prior art transformers are able to handle low tolerances such as 8 mA of DC current bias and the corresponding power such current produces. Now, industry standards are requiring that isolating magnetics handle 24 mA and as much as 34 mA of DC current bias. For example, the IEEE 802.3 AN standard requires such current bias tolerance. Prior art transformers are generally not capable of handling such currents and power.

As an illustrative example, referring to FIG. 1, there is shown a transformer 40 in accordance with the prior art. Transformer 40 may be used as an isolating magnetic device. Transformer 40 is formed by winding wires 44, 46, 48 and 50 around a toroid shaped core 42 formed of a conductive material. Core 42 has a substantially circular cross-section. Wires 44, 46, 48 and 50 are evenly wound around core 42 except in a gap area 38. As discussed above, when a high power DC current bias is added onto an alternating current and applied to one side of transformer 40, the entire core of transformer 40 may become saturated from the induced magnetic flux. Such saturation inhibits transfer of data in the alternating current component. Some attempts to compensate for this problem in the prior art include using a larger core 42. However, use of a larger core is not practical in many applications including connector applications due to space limitations.

Therefore, there is a need in the art for an electric device which can handle higher power DC current bias than transformers available in the prior art and a method for manufacturing such a device.

SUMMARY OF THE INVENTION

One aspect of the invention is a method for producing an electric device. The method comprises inserting at least a first wire through a first hole in a core and wrapping the first wire around a first side of the core. The method further comprises inserting at least a second wire through a second hole in the core, the second hole being spaced from the first hole and having a long axis extending substantially parallel to a long axis of the first hole; and wrapping the second wire around a second side of the core, the second side being spaced from the first side.

Another aspect of the invention is an electrical device produced by a method of inserting at least a first wire through a first hole in a core and wrapping the first wire around a first side of the core. The method further comprises inserting at least a second wire through a second hole in the core, the second hole being spaced from the first hole and having a long axis extending substantially parallel to a long axis of the first hole; and wrapping the second wire around a second side of the core, the second side being spaced from the first side.

Yet another aspect of the invention is a connector for enabling electrical communication with a plug. The connector comprises a set of contacts and a filter circuit in communication with the set of contacts. The connector further comprises a set of terminals in communication with the filter circuit; wherein the filter circuit includes a transformer with a core. The transformer is produced by the steps of inserting at least a first wire through a first hole in the core and wrapping the first wire around a first side of the core. The transformer is further produced by inserting at least a second wire through a second hole in the core, the second hole being spaced from the first hole and having a long axis extending substantially parallel to a long axis of the first hole. The transformer is further produced by wrapping the second wire around a second side of the core, the second side being spaced from the first side.

Another aspect of the invention is a method for producing an electrical device. The method comprises wrapping a first and second wire around a first core and inserting the first and second wire and a third and a fourth wire through a first hole in a second core. The method further comprises wrapping the first, second, third and fourth wires around a first side of the second core and inserting fifth, sixth, seventh and eighth wires through a second hole in the second core, the second hole being spaced from the first hole and having a long axis extending substantially parallel to a long axis of the first hole. The method further comprises wrapping the fifth, sixth, seventh and eighth wires around a second side of the second core, the second side being spaced from the first side; and wrapping the fifth and sixth wires around the first core.

Yet another aspect of the invention is a connector for enabling electrical communication with a plug. The connector comprises a set of contacts and a filter circuit in communication with the set of contacts. The connector further comprises a set of terminals in communication with the filter circuit. The filter circuit is produced by the steps of wrapping a first and second wire around a first core and inserting the first and second wire and a third and a fourth wire through a first hole in a second core. The filter circuit is further produced by the steps of wrapping the first, second, third and fourth wires around a first side of the second core and inserting fifth, sixth, seventh and eighth wires through a second hole in the second core, the second hole being spaced from the first hole and having a long axis extending substantially parallel to a long axis of the first hole. The filter circuit is further produced by the steps of wrapping the fifth, sixth, seventh and eighth wires around a second side of the second core, the second side being spaced from the first side; and wrapping the fifth and sixth wires around the first core.

Yet another aspect of the invention is an electrical device comprising a body having first and second holes extending therethough, the holes being spaced from one another and having longitudinal axes extending substantially parallel to one another. The electrical device further comprises at least one wire extending through the first hole, the wire wrapped around a first side of the body and at least a second wire extending through the second hole in the body and wrapped around a second side of the body, the second side being spaced from the first side.

BRIEF DESCRIPTION OF THE DRAWINGS

A more complete appreciation of the present invention and many of the attendant features and advantages thereof will be readily understood by reference to the following detailed description when taken in conjunction with the accompanying drawings in which.

DETAILED DESCRIPTION OF THE PREFERRED EMBODIMENT(S)

Figure 1:
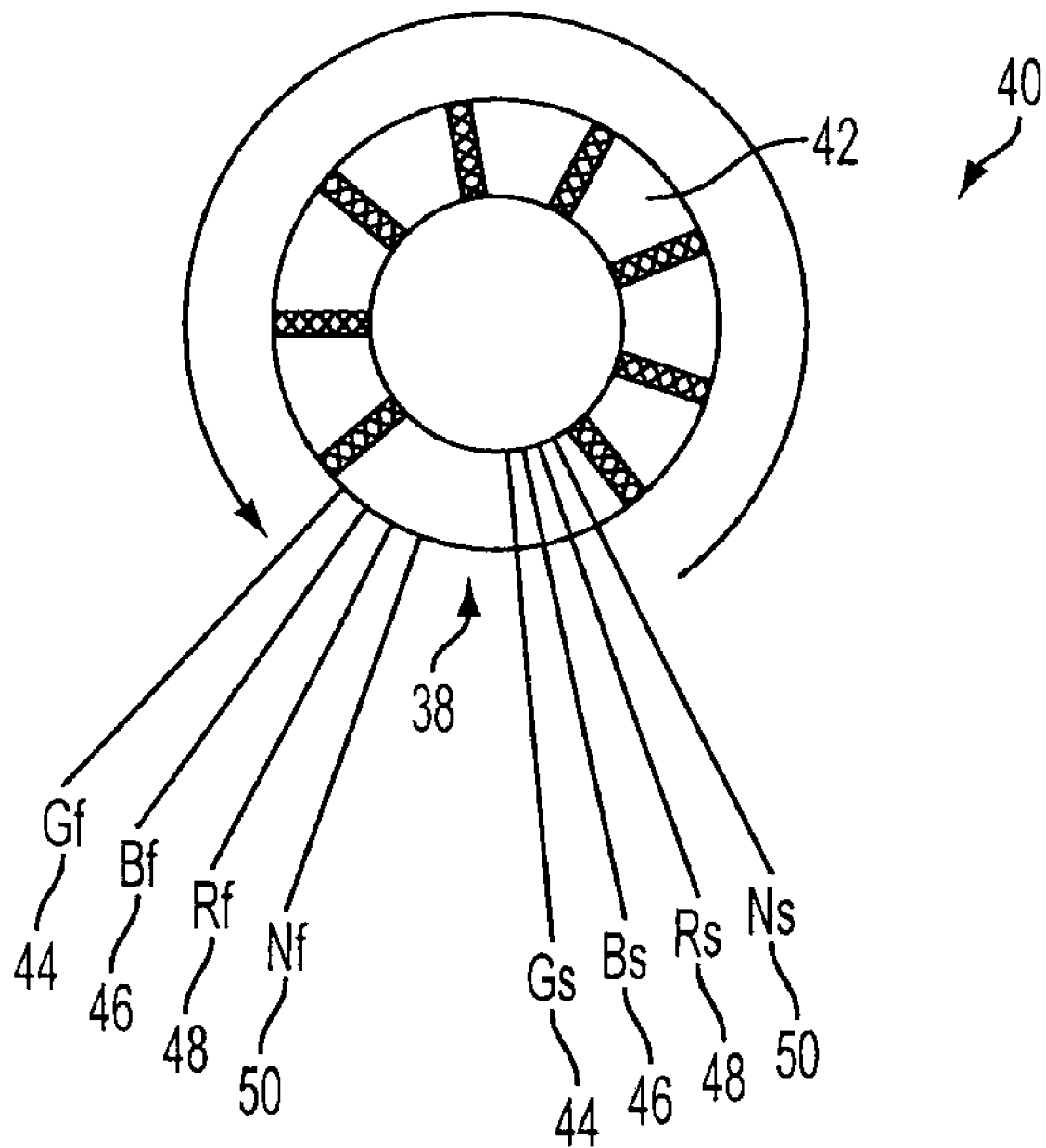
FIG. 1 is front view of a transformer in accordance with the prior art.
Figure 2:
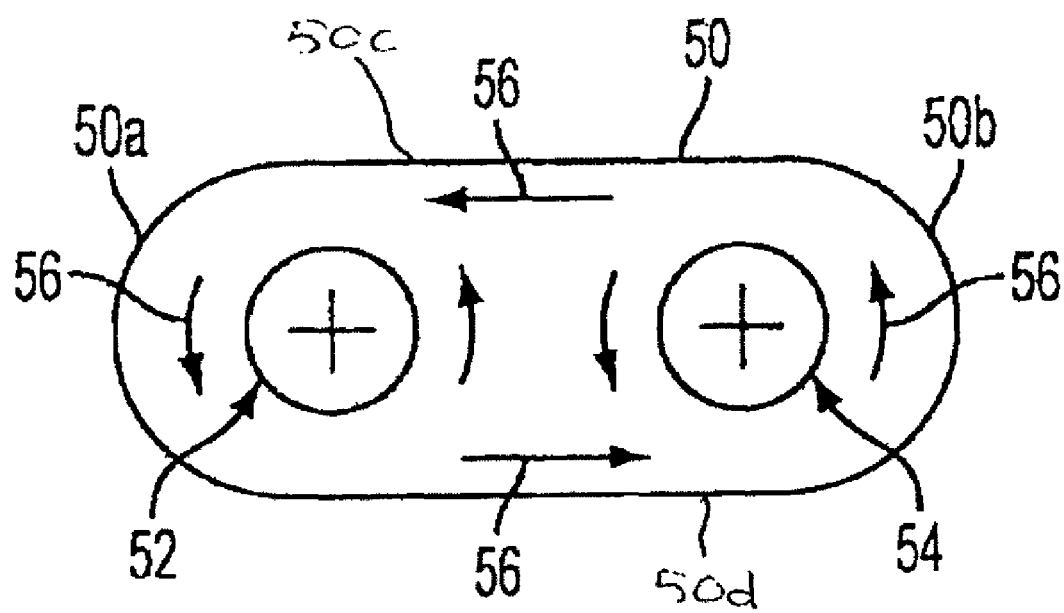
FIG. 2 is a side view of a core for use in accordance with an embodiment of the invention.
Figure 3C:
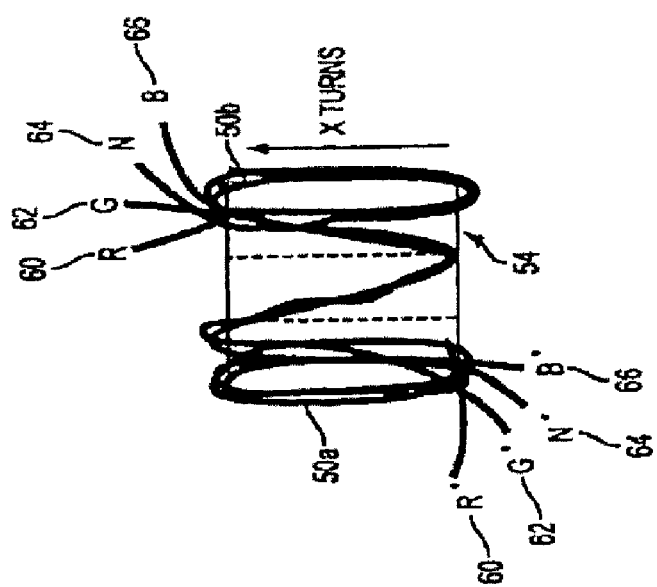
FIGS. 3A, 3B and 3C illustrate steps of winding wires around a core of the type shown in FIG. 2 in accordance with an embodiment of the invention.
Figure 3B:
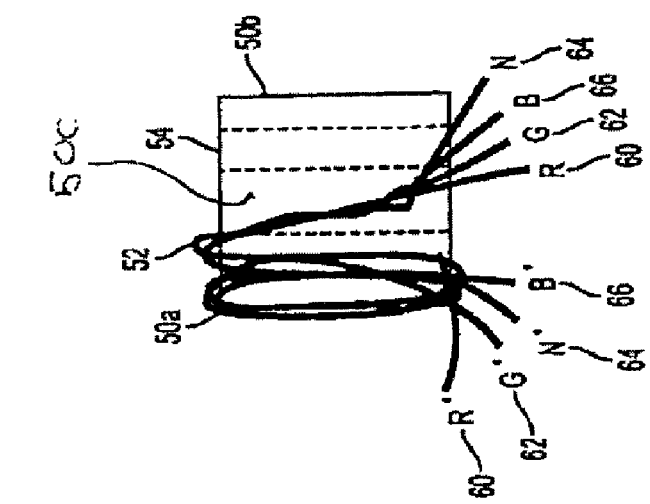
Figure 3A:
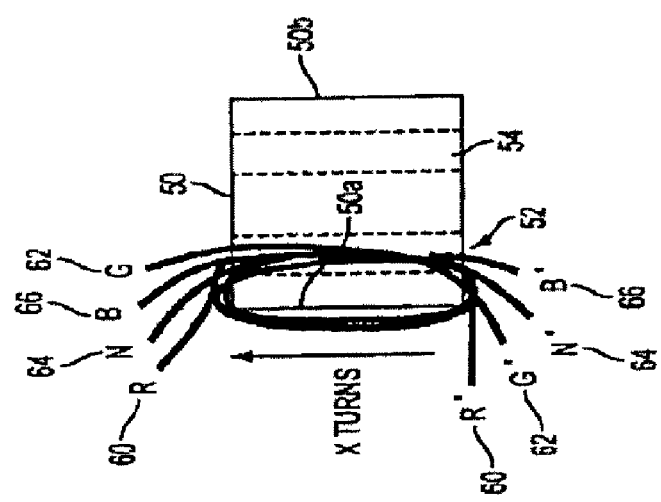

Referring now to the drawings wherein like reference numerals describe identical or corresponding parts throughout the several views, and more particularly to FIGS. 2 and 3A-3C, a core 50 resembles an ellipsoid with its ends cut off and with a substantially racetrack shaped cross-section. Core 50 may be made of a MgZn material with a permeability of 5000. As shown in FIG. 2, core 50 includes a first hole 52 and a second hole 54 spaced from first hole 52. Magnetic flux lines 56 which are set up in the core during operation are also schematically shown and will become clearer upon further discussion. Core 50 has a first side 50a, a second side 50b, a top 50c and a bottom 50d. Referring to FIG. 3A, in order to manufacture an electric device in accordance with an embodiment of the invention, four wires 60, 62, 64 and 66 are wrapped around core 50. Clearly, four wires are shown simply as an example and any number of wires may be used. Wires 60, 62, 64 and 66 are inserted through hole 52 of core 50. Wires 60, 62, 64 and 66 are then wrapped around first side 50a of core 50. Wires 60, 62, 64 and 66 are then inserted through hole 52 again and wrapped around side 50a again for a desired number of turns. For example, X turns may be used. Once wires 60, 62, 64 and 66 have been wrapped through hole 52 and around side 50a of core 50, X number of turns, the wires are extended across either a top 50c or bottom 50d of core 50 for insertion into hole 54—as shown in FIG. 3B (where the wires extend across the top 50c). Alternatively, a second set of wires (not explicitly shown) may be used for insertion into hole 54. The top 50c and bottom 50d of core 50 may be identical and so effectively both a top and bottom view are shown.

Figure 4:
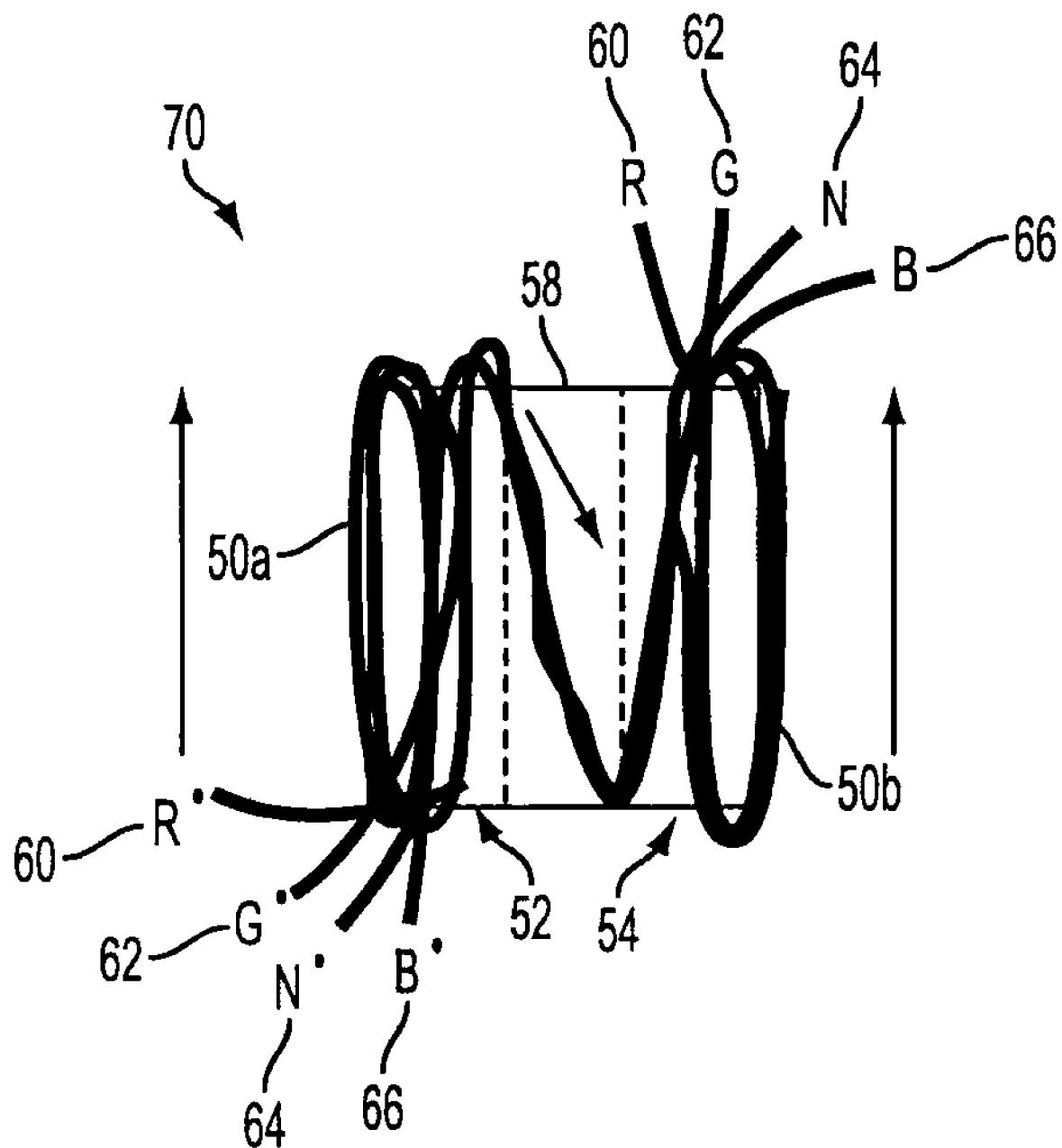
FIG. 4 is a top view of an electric device constructed in accordance with an embodiment of the invention.

Referring to FIG. 3C, wires 60, 62, 64 and 66 (or a second set of wires) are then inserted through hole 54 of core 50 and then wrapped around second side 50b of core 50. The wires are inserted through hole 54 and wrapped around second side 50b the desired number of turns—for example, X turns. Dot notation is used to assist an assemblyman in performing the windings—where the dots indicate starting points for the wires. As shown in FIGS. 3C and 4, after the wires have been wrapped through hole 52, around first side 50a, through hole 54 and around second side 50b, an electric device 70 in accordance with the invention is realized. Again, the extension of the wires over the top/bottom 50c/50d of core 50 need not be performed, if two sets of wires are used.

Figure 5:
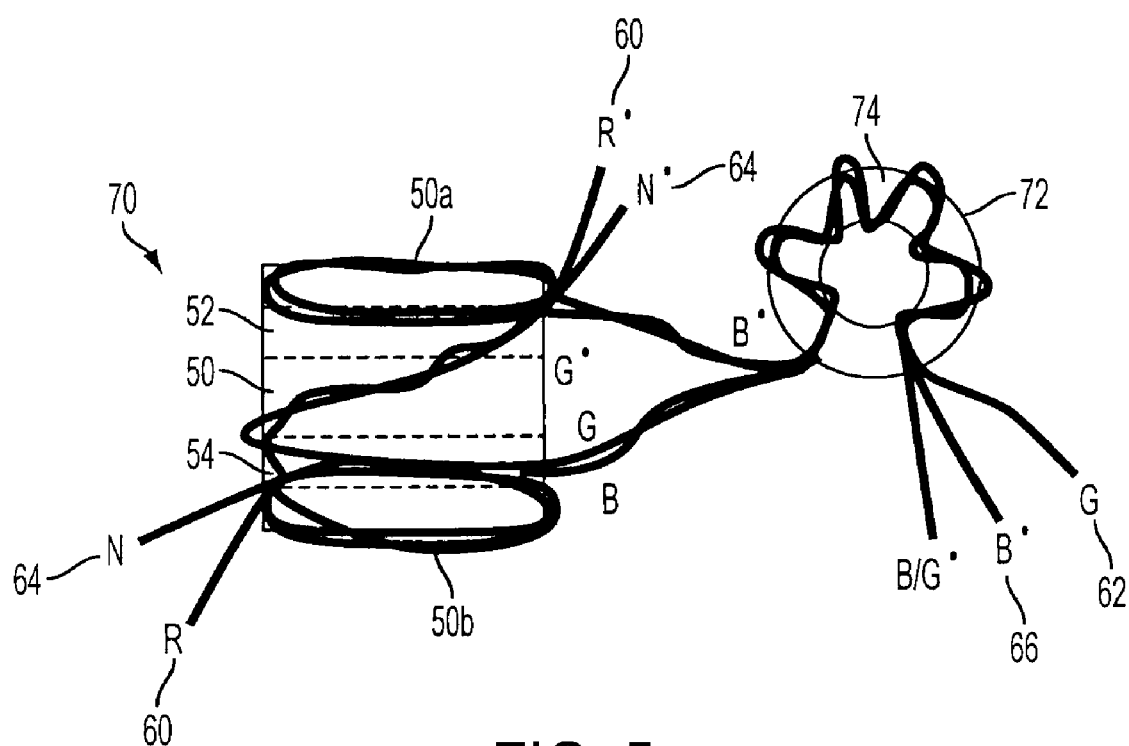
FIG. 5 is a top view of an electric device and a common mode choke constructed in accordance with an embodiment of the invention.

If desired, device 70 may be combined with a conventional common mode choke 72 as shown in FIG. 5. To form this combination, wires 62 and 66 are first wound around a toroid 74 having a substantially circular cross-section. Wires 62 and 66 (shown as being green and blue in color, respectively) are joined with wires 60 and 64 (red and natural) and wrapped through hole 52 and first side 50a. Wires 60, 62, 64 and 66 are then extended over a top or bottom of core 70 (except in situations where two sets of wires are used) and then wrapped through hole 54 and second side 50b. Wires 60, 64 remain on a left side of core 70 while wires 62 and 66 are wound again around toroid 74.

Figure 6:
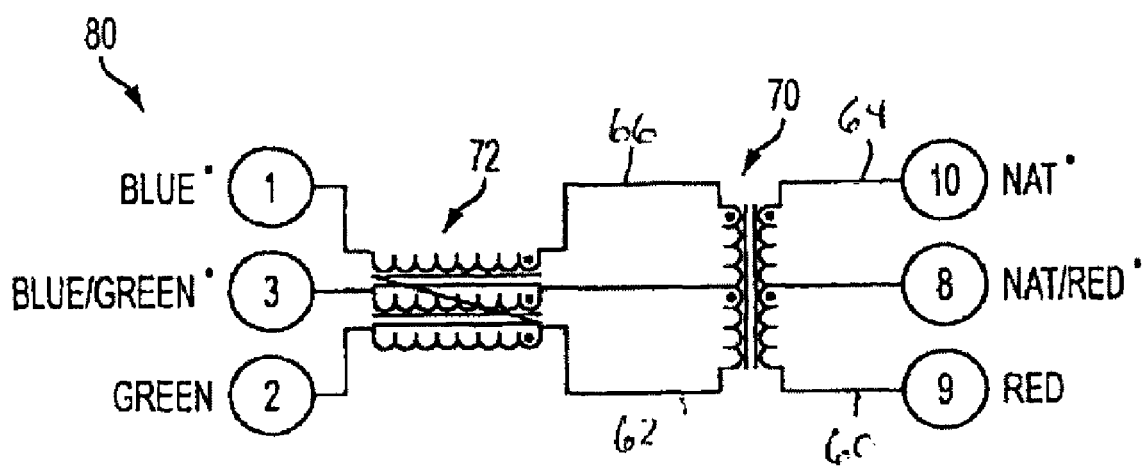
FIG. 6 is a diagram of a circuit which incorporates an electric device in accordance with an embodiment of the invention.

Referring to FIG. 6, there is shown a circuit 80 which may use device 70. As shown, circuit 80 is a representation of the combination of device 70 and common mode choke 72 illustrated in FIG. 5. Referring momentarily, to FIG. 2, in electric device 70, magnetic flux lines occurring in a central portion of the device extend in opposing directions. Conversely, magnetic flux lines towards distal ends of the device 70, extend in only a single direction. If such flux lines have a high enough intensity, such as may be provided by high power DC current bias, the flux may indeed saturate those portions of the device. However, as the flux lines in the central portion of the device may cancel each other out, saturation does not occur in the central portion and data transfer may still occur in that area.

Figure 7:
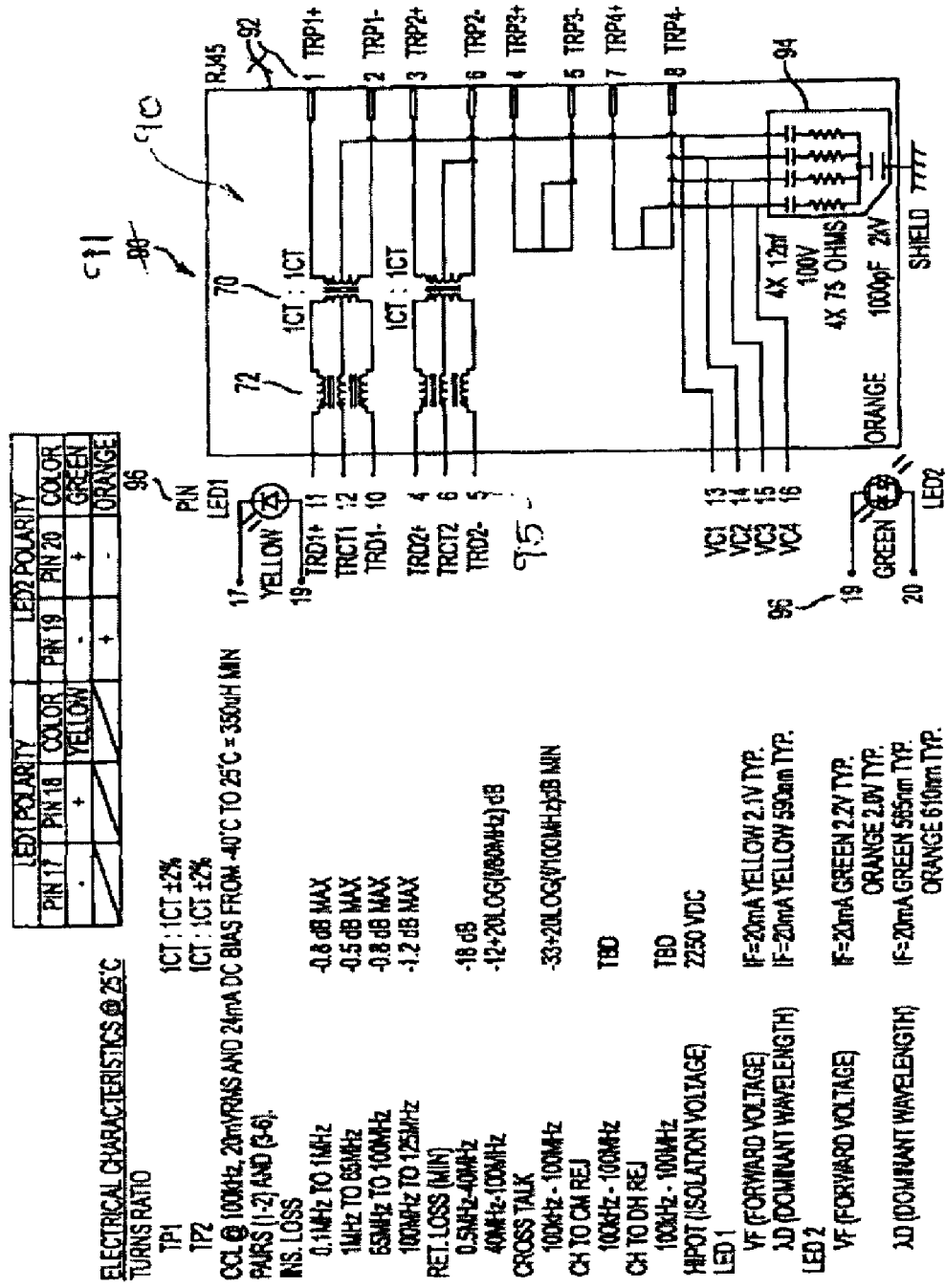
FIG. 7 is a diagram of a circuit and corresponding tolerances of circuit devices including an electric device in accordance with an embodiment of the invention.

Referring to FIG. 7 there is shown another circuit 90 which uses an electric device in accordance with an embodiment of the invention. Circuit 90 forms a part of an RJ45 modular type connector 91 and couples connector contacts 92 with connector terminals 95. As shown connector contacts 92 are arranged to engage the contacts of a plug (not shown) which is coupled to the connector. A termination circuit 94 may be used to balance a load of wires in said plug. Device 70 may be used as the load for the terminals of the plug. Choke 72 may be utilized to minimize the presence of common mode currents. As shown, optional LEDs 96 may be used. As discussed, device 70 allows data to be transmitted therethrough even in the presence of high power DC current bias and corresponding induced magnetic fields. Some tolerances which may be used for the circuit elements are shown.

Figure 8:
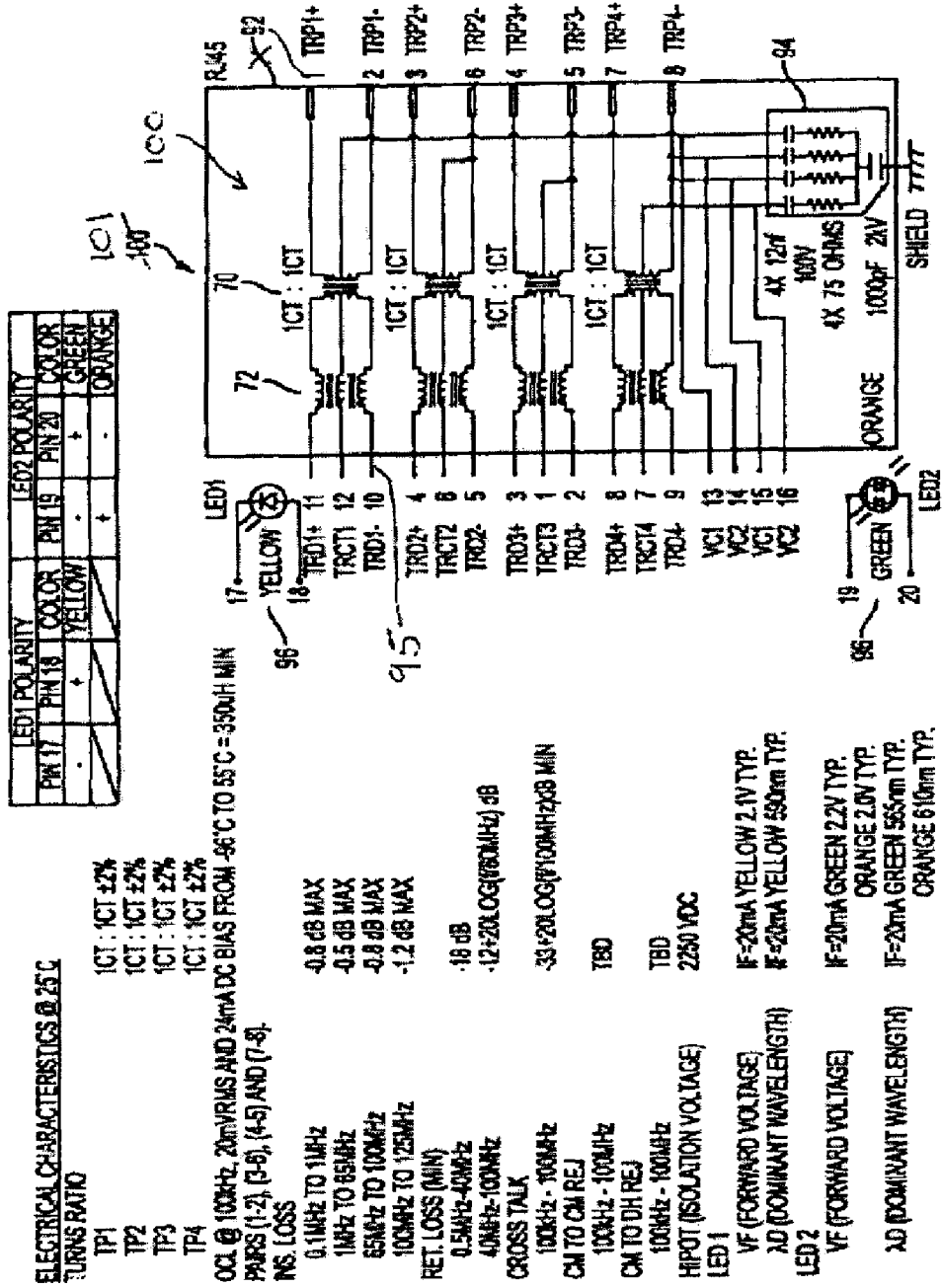
FIG. 8 is a diagram of a circuit and corresponding tolerances of circuit devices including an electric device in accordance with an embodiment of the invention.

Referring to FIG. 8, another circuit 100 including a device 70, a choke 72 and a termination circuit 94 is shown with forming part of an RJ45 modular type connector 101 and which couples connector contacts 92 connector terminals 95. In circuit 100, four sets of devices 70 and chokes 72 are utilized.

Thus, by implementing a new winding method, a new electric device may be realized which can handle higher power currents and magnetizing forces which would saturate devices of the prior art. As discussed, any number of turns may be used for each of the windings. The number of turns may be based on a desired return loss parameter. Moreover, although four wires are shown, clearly any number of wires may be used.

In the prior art devices, high power DC currents create a magnetic flux which may saturate the entire transformer. As a consequence, AC data cannot pass through the transformer because there is no magnetizing force available. In contrast, in the invention, the center of the electric device does not necessarily saturate and so data may pass therethrough. Moreover, higher power and corresponding induced magnetizing force can be handled and the device may comply with current IEEE standards. Furthermore, in the prior art, some attempts to deal with these issues include use of a larger transformer. In contrast, a core with the size of, for example, ¼ inch by ¼ inch by ⅛ of an inch may be used in the invention. In the prior art, a toroid of twice that size may be required. An electric device in accordance with the invention may be backward compatible and may also be used in low power applications.

While preferred embodiments of the invention have described, the scope of the invention is only limited by the claims.

What is claimed is:

1. An electrical isolation device comprising:
 a core having a top surface, a bottom surface, first and second exterior sides spaced from each other and first and second elongate holes formed therethrough, said first and second holes being spaced from each other and having respective longitudinal axes extending substantially parallel to each other, said top and bottom core surfaces situated in planes which are substantially parallel to said longitudinal axes of said elongate holes; and
 at least two pairs of wires, each of which is inserted through said first hole in said core, wrapped around said first side of said core, extended over said top or said bottom of said core, inserted through said second hole in said core and wrapped around said second side of said core.

2. A method for producing an electrical isolation device including a core having first and second elongate holes formed therethrough having respective longitudinal axes extending substantially parallel to each other, and at least one first wire pair and at least one second wire pair, comprising the steps of:
 inserting said at least one first wire pair and said at least one second wire pair through said first elongate hole in said core,
 wrapping said first and second wire pairs around a first exterior side of said core,
 extending said first and second wire pairs over a top surface or a bottom surface of said core, said top and bottom core surfaces situated in planes which are substantially parallel to said longitudinal axes of said elongate holes,
 inserting said first and second wire pairs through said second elongate hole in said core which is spaced from said first hole, and
 wrapping said first and second wire pairs around a second exterior side of said core which is spaced from said first side of said core.

3. A connector comprising:
 a set of contacts structured and arranged to engage the contacts of a mating connector;
 a set of terminals; and
 a circuit electrically coupling said contacts and said terminals to each other, said circuit including an electrical isolation device having,
 a core having a top surface, a bottom surface, first and second exterior sides spaced from each other and first and second elongate holes formed therethrough, said first and second holes being spaced from each other and having respective longitudinal axes extending substantially parallel to each other, said top and bottom core surfaces situated in planes which are substantially parallel to said longitudinal axes of said elongate holes, and
 at least two wire pairs, each of which is inserted through said first hole in said core, wrapped around said first side of said core, extended over said top or said bottom of said core, inserted through said second hole in said core and wrapped around said second side of the core which is spaced from said first side and said core.

4. A connector as recited in claim 3 wherein said connector is a modular connector.

5. A connector as recited in claim 4 wherein said connector is an RJ45 modular connector.

6. A connector as recited in claim 3 wherein said at least two wire pairs include at least one first wire pair and at least one second wire pair, and wherein said at least one first wire pair is electrically coupled to said connector contacts and said at least one second wire pair is electrically coupled to said connector terminals.

7. A connector as recited in claim 6 wherein said core and said wires constitute a transformer and wherein a first one of said at least two pairs of wires comprises a pair of first wires and another one of said at least two pairs of wires comprises a pair of second wires, and wherein said pair of first wires constitutes a first winding of the transformer and said pair of second wires constitutes a second winding of the transformer.

8. An electrical assembly comprising:
 an electrical isolation device including,
 a core having a top surface, a bottom surface, first and second exterior sides spaced from each other and first and second elongate holes formed therethrough, said first and second holes being spaced from each other and having respective longitudinal axes extending substantially parallel to each other, said top and bottom core surfaces situated in planes which are substantially parallel to said longitudinal axes of said elongate holes; and
 at least two pairs of wires, each pair of wires inserted through said first hole in said core, wrapped around said first side of said core, extended over said top or said bottom surface of said core, inserted through said second hole in said core and wrapped around said second side of said core; and
 a common mode choke coupled to said electrical isolation device including,
 a choke core; and wherein
 one pair of said at least two pairs of wires are wound around said choke core.

9. An electrical device as recited in claim 8 wherein said choke coil has a toroidal shape.

10. A connector comprising:

a set of contacts structured and arranged to engage the contacts of a mating connector;

a set of terminals; and a circuit electrically coupling said contacts and said terminals to each other, said circuit including, an electrical isolation device including, core having a top surface, a bottom surface, first and second exterior sides spaced from each other and first and second elongate holes formed therethrough, said first and second holes being spaced from each other and having respective longitudinal axes extending substantially parallel to each other, said top and bottom core surfaces situated in planes which are substantially parallel to said longitudinal axes of said elongate holes; and at least a pair two pairs of wires, each pair of wires inserted through said first hole in said core, wrapped around said first side of said core, extended over said top or said bottom surface of said core, inserted through said second hole in said core and wrapped around said second side of said core; and a common mode choke coupled to said electrical isolation device including, a choke core; and wherein one pair of said at least two pairs of wires are wound around said choke core.

11. A connector as recited in claim 10 wherein said core and said wires constitute a transformer and wherein one of said two pairs of wire constitutes a first winding of the transformer and the other of said two pairs of wires constitutes a second winding of the transformer.

12. A connector as recited in claim 10 wherein said connector is a modular connector.

13. A connector as recited in claim 12 wherein said connector is an RJ45 modular connector.

14. A connector as recited in claim 10 wherein said contacts are electrically coupled to one of said pair of wires and said terminals are coupled to said pair of wires wound around said choke core.

15. A connector as recited in claim 14 wherein said isolation device comprises a transformer, and wherein one of said at least two pairs of wires constitute a first winding of the transformer and a second one of said two pairs of wires constitute a second winding of the transformer.

* * * * *